United States Patent
Pourchot et al.

(10) Patent No.: US 10,001,279 B2
(45) Date of Patent: Jun. 19, 2018

(54) OXY BOILER POWER PLANT WITH A HEAT INTEGRATED AIR SEPARATION UNIT

(71) Applicant: General Electric Technology GmbH, Baden (CH)

(72) Inventors: Thierry Pourchot, Naves Parmelan (FR); Francois Granier, Vetrigne (FR); Frederic Geiger, Giromagny (FR)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 259 days.

(21) Appl. No.: 14/682,879

(22) Filed: Apr. 9, 2015

(65) Prior Publication Data

US 2015/0330628 A1    Nov. 19, 2015

(30) Foreign Application Priority Data

May 8, 2014    (EP) ..................... 14290140

(51) Int. Cl.
| | | |
|---|---|---|
| F01K 7/16 | (2006.01) | |
| F01K 7/34 | (2006.01) | |
| F01K 7/40 | (2006.01) | |
| F01K 7/44 | (2006.01) | |
| F23L 7/00 | (2006.01) | |
| F01K 9/02 | (2006.01) | |
| F01K 13/00 | (2006.01) | |
| F01K 17/06 | (2006.01) | |

(52) U.S. Cl.
CPC ................ *F23L 7/007* (2013.01); *F01K 7/16* (2013.01); *F01K 7/40* (2013.01); *F01K 9/023* (2013.01); *F01K 13/00* (2013.01); *F01K 17/06* (2013.01); *Y02E 20/344* (2013.01)

(58) Field of Classification Search
CPC ... B01D 2257/504; Y02E 20/14; Y02E 20/16; Y02E 20/34; Y02E 20/344; Y02C 10/06; Y02C 10/08; Y02C 10/14; F01K 7/34; F01K 7/44; F01K 17/00–17/06
USPC ........... 60/677, 678, 685, 690–693; 423/220, 423/437.1; 110/345; 95/139, 183
See application file for complete search history.

(56) References Cited

U.S. PATENT DOCUMENTS

| | | | |
|---|---|---|---|
| 2,921,441 A * | 1/1960 | Buri ......................... | F01K 7/40 122/1 C |
| 2,991,620 A | 7/1961 | Nekolny | |
| 3,032,999 A | 5/1962 | Pacault | |

(Continued)

FOREIGN PATENT DOCUMENTS

| | | |
|---|---|---|
| DE | 102004059358 A1 | 6/2005 |
| DE | 102009014185 A1 | 9/2010 |

(Continued)

OTHER PUBLICATIONS

European Search Report for EP 14290140.4 dated Jan. 28, 2015.

(Continued)

*Primary Examiner* — Laert Dounis

(57) ABSTRACT

An Air Separation Unit is disclosed which is thermally integrated into a coal fired oxy boiler power plant. The Air Separation Unit has a Dryer with a dryer heater, wherein an extraction line connects the steam extraction port to the dryer heater. A drain line of the dryer heater then fluidly connects the regeneration heater to a point of a Rankine steam cycle fluidly within the condensate system.

13 Claims, 2 Drawing Sheets

(56) References Cited

U.S. PATENT DOCUMENTS

| | | | |
|---|---|---|---|
| 3,271,960 A * | 9/1966 | Brunner | F01K 7/24 60/648 |
| 3,374,621 A * | 3/1968 | Cosar | F01K 7/44 122/1 R |
| 3,423,933 A * | 1/1969 | Klaus | F01K 7/40 60/503 |
| 3,835,650 A | 9/1974 | Chesmejef | |
| 4,069,674 A | 1/1978 | Warren | |
| 4,516,403 A | 5/1985 | Tanaka | |
| 4,729,217 A * | 3/1988 | Kehlhofer | F01K 23/068 60/39.12 |
| 4,897,999 A | 2/1990 | Varney | |
| 4,976,107 A * | 12/1990 | Korpela | F01K 17/02 110/224 |
| 5,344,627 A | 9/1994 | Fujii et al. | |
| 5,345,756 A | 9/1994 | Johnke et al. | |
| 5,836,162 A * | 11/1998 | Haynes | F01K 7/40 60/663 |
| 7,581,395 B2 | 9/2009 | Takeuchi et al. | |
| 2002/0023423 A1* | 2/2002 | Viteri | F01K 21/047 60/772 |
| 2005/0235650 A1* | 10/2005 | Griffin | F02C 3/22 60/780 |
| 2006/0254251 A1 | 11/2006 | Yamada | |
| 2008/0302107 A1* | 12/2008 | Fan | B01D 53/002 60/783 |
| 2009/0178408 A1* | 7/2009 | Brugerolle | F25J 3/0406 60/645 |
| 2010/0071380 A1* | 3/2010 | Buecker | B01D 53/22 60/772 |
| 2010/0132360 A1* | 6/2010 | Gericke | F01K 3/20 60/653 |
| 2010/0258005 A1 | 10/2010 | Oishi et al. | |
| 2011/0220744 A1* | 9/2011 | Zhao | F01K 7/22 241/18 |
| 2011/0277479 A1 | 11/2011 | Richter et al. | |
| 2011/0290163 A1 | 12/2011 | Kobayashi | |
| 2012/0111007 A1* | 5/2012 | Fruh | F01K 17/02 60/648 |
| 2012/0129112 A1 | 5/2012 | Cegarra Cruz et al. | |
| 2012/0151917 A1 | 6/2012 | Ungerer et al. | |
| 2012/0216540 A1* | 8/2012 | Stoever | B01D 53/1475 60/653 |
| 2012/0324893 A1* | 12/2012 | Hayashi | F01K 7/40 60/691 |
| 2013/0062883 A1 | 3/2013 | Kaneeda et al. | |
| 2013/0099508 A1* | 4/2013 | Handagama | H02P 9/04 290/40 B |
| 2014/0007576 A1 | 1/2014 | Alekseev | |
| 2014/0065559 A1 | 3/2014 | Jukkola | |
| 2015/0323179 A1* | 11/2015 | Pourchot | F23L 7/007 110/304 |
| 2016/0033128 A1 | 2/2016 | Stuxberg | |

FOREIGN PATENT DOCUMENTS

| | | |
|---|---|---|
| EP | 2 682 569 A1 | 1/2014 |
| JP | 062806 A | 1/1994 |
| WO | WO 2006/131283 A2 | 12/2006 |
| WO | 2011006862 A2 | 1/2011 |

OTHER PUBLICATIONS

Bouillon, "ECO2:Post-combustion or Oxyfuel—A comparison between coal power plants with integrated CO2 capture", Science Direct, 2009, 4015-4022, Energy Procedia 1.

Beer et al., "Measures for Increasing the Net Efficiency of an Existing 300-MW-Block", VGB Kraftwerkslechnik GMBH, vol. No. 77, Issue No. 05, pp. 358-362, May 1, 1997.

Pourchot et al., "Integration of Oxy Combustion in a Large Size USC PC Plant for a Competitive Solution", 3rd Oxyfuel Combustion Conference, Spain, pp. 1-20, Sep. 12, 2013.

European Search Report and Opinion issued in connection with Related EP Application No. 14290138.8 dated Jan. 28, 2015.

European Search Report and Opinion issued in connection with Related EP Application No. 14290139.6 dated Jan. 28, 2015.

European Search Report and Opinion issued in connection with Related EP Application No. 14290141.2 dated Jan. 28, 2015.

U.S. Non-Final Office Action issued in connection with Related U.S. Appl. No. 14/707,593 dated Dec. 21, 2016.

U.S. Non-Final Office Action issued in connection with Related U.S. Appl. No. 14/675,305 dated Feb. 17, 2017.

U.S. Non-Final Office Action issued in connection with Related U.S. Appl. No. 14/707,744 dated Mar. 13, 2017.

U.S. Final Office Action issued in connection with Related U.S. Appl. No. 14/707,593 dated May 10, 2017.

U.S. Final Office Action issued in connection with Related U.S. Appl. No. 14/675,305 dated Jul. 6, 2017.

* cited by examiner

OXY BOILER POWER PLANT WITH A HEAT INTEGRATED AIR SEPARATION UNIT

TECHNICAL FIELD

The present disclosure relates generally to heat integration schemes applied to coal fired oxy boiler power plant, and more specifically to Air Separation Unit heat integration into such plants.

BACKGROUND INFORMATION

Coal contributes to a large percentage of the electricity generation in the world today and is expected to maintain its dominant share in the foreseeable future. Nonetheless, significant environmental pressures have led to increased environmental demands requiring not only high efficiency but also reduced emission levels of CO2, SO2, NOx, and mercury to ultra-low levels.

A particular advantageous plant arrangement is the use of an Oxy-combustion steam plant with CO2 capture. Oxy-combustion systems use oxygen, usually produced in an air separation unit instead of air, for the combustion of the primary fuel. The oxygen is often mixed with an inert gas, such as recirculated flue gas, in order to keep the combustion temperature at a suitable level. Oxy-combustion processes produce flue gas having CO2, water and O2 as its main constituents, the CO2 concentration being typically greater than about 70% by volume. Therefore, CO2 capture from the flue gas of an oxy-combustion process can be done relatively simply in a Gas Processing Unit.

An example of a typical water steam cycle of a high efficiency oxy-combustion steam plants is shown in FIG. 1. The plant comprises a triple-pressure series of reheat steam turbines HP, IP, LP fed by steam from a boiler 142. Exhaust steam from the last low pressure steam turbine LP is condensed in a condenser 102 before being polished 104 and pumped via a condenser Extraction pump second stage 103 successively through a series of low pressure heater 106, 107, 108, 109, 131, a feed water tank 136 and high pressure heaters 132 before returning to the boiler 142 in a closed loop. The heat source for the low and high pressure heaters is typically steam extracted from the low/intermediate and high pressure steam turbines.

Due to the large benefit in ensuring the highest efficiency cycle there is a continuing need to find ways of better integrating the thermal needs and sinks of the oxy-combustion capture systems within the steam power plant. This requires an optimization of the heat needs and sinks of the capture systems with the plant cycle to ensure no energy is wasted. In particular, these needs take consideration of how to integrate the Air Separation Unit into the condensate cycle.

SUMMARY

A coal fired Oxy boiler with oxygen supply system and flue gas CO2 capture system and a steam cycle power plant scheme is provided that integrates major heat generation sources of the systems in order to provide flexible plant operation and improved overall plant thermal efficiency.

The disclosure attempts to address this problem by means of the subject matters of the independent claim. Advantageous embodiments are given in the dependent claims.

The disclosure is based on the general idea of a novel scheme for thermally incorporating an Air Separation Unit into the condensate system of a coal fired oxy boiler power plant.

An aspect provides a coal fired Oxy boiler power plant comprising a Rankine steam cycle having a high pressure steam turbine, adapted to expand steam, having an exit, an intermediate pressure steam turbine adapted to expand steam from the high pressure steam turbine, and a low pressure steam turbine adapted to expand steam from the intermediate pressure steam turbine having a steam extraction port. A condensate system of the cycle further comprises a condenser adapted to condense steam exhausted from the low pressure steam turbine, a series of low pressure heaters adapted to receive and serially heat condensate from the condenser, a feed water tank configured and arranged to receive condensate from the series of low pressure heaters, and a series of high pressure heaters adapted to receive condensate from the feed water tank.

The oxy boiler power plant further comprises an Air Separation Unit having a Dryer and a dryer regenerator with a dryer heater wherein an extraction line connects the steam extraction port to the dryer heater. A drain line then fluidly connects the regeneration heater to a point of the Rankine steam cycle fluidly between the series of low pressure heater.

In an aspect the intermediate pressure steam turbine is a multi-stage intermediate pressure steam turbine and the steam extraction port is configured and arranged to extract steam from an intermediate stage of the intermediate pressure steam turbine.

In an aspect an emergency line is connected to the drain line and the condenser.

In an aspect a cold reheat line is connected at a first end to the HP steam turbine exit and at a second end to the extraction line.

In a further aspect the cold reheat line includes a control valve.

It is a further object of the invention to overcome or at least ameliorate the disadvantages and shortcomings of the prior art or provide a useful alternative.

Other aspects and advantages of the present disclosure will become apparent from the following description, taken in connection with the accompanying drawings which by way of example illustrate exemplary embodiments of the present invention.

BRIEF DESCRIPTION OF THE DRAWINGS

By way of example, an embodiment of the present disclosure is described more fully hereinafter with reference to the accompanying drawings, in which.

DETAILED DESCRIPTION

Figure 1:
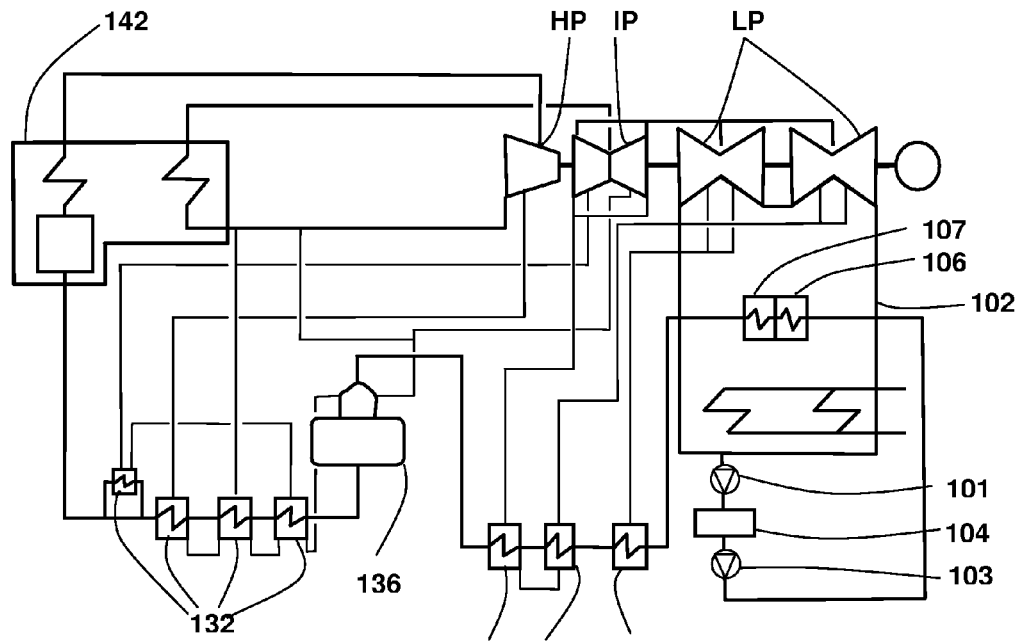
FIG. 1 is a schematic of a coal fired oxy boiler power plant of the prior art to which exemplary embodiments may be applied.

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiments disclosed herein.

Throughout this specification reference is made to serial units. In this context serial means arranged in a series starting from an upstream end as defined by the nominal flow of working fluid through the unit during it's normal operation.

Figure 2:
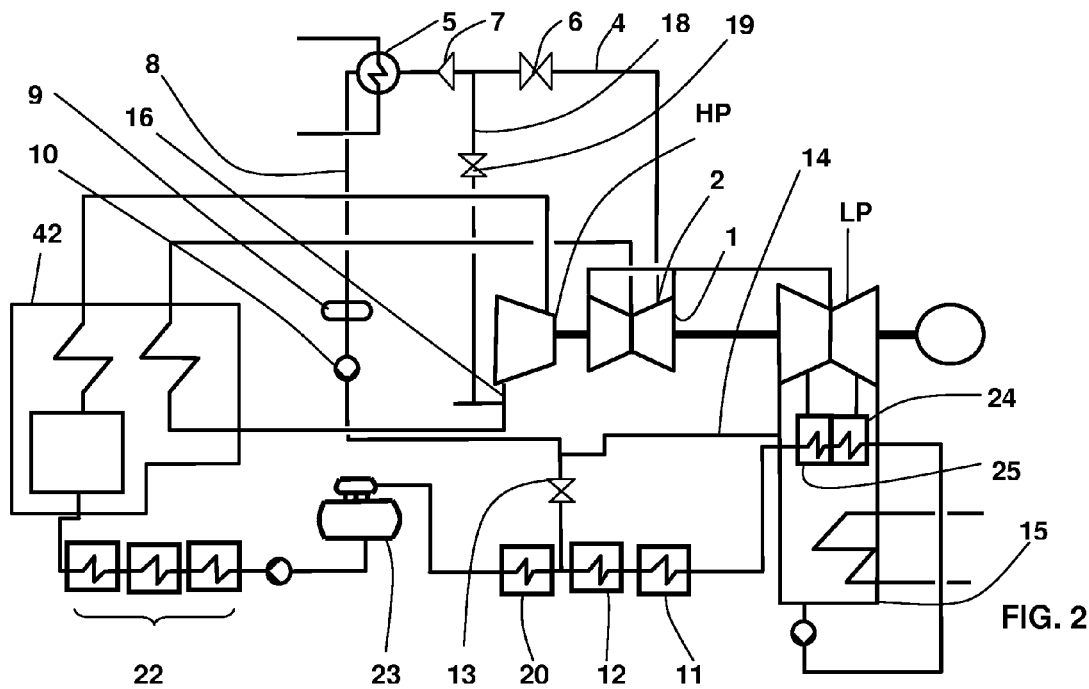
FIG. 2 is a schematic of the heat integration of an Air Separation Unit drier into a coal fired oxy boiler power plant.

In an exemplary embodiment shown in FIG. 2, which may be applied to a coal fired oxy boiler power plant shown in FIG. 1, a steam extraction arrangement and condensate return scheme for heat supply to an Air Separation Unit dryer regenerator is provided. As shown in FIG. 2 the coal fired oxy boiler power plant comprises a Rankine steam cycle having a high pressure steam turbine HP adapted to expand steam having an exit 16, an intermediate pressure steam turbine 1 having a steam extraction port 2 adapted to expand steam from the high pressure steam turbine HP, and a low pressure steam turbine LP adapted to expand steam from the intermediate pressure steam turbine 1. A condenser 15, connected to the low pressure steam turbine LP exhaust, condenses exhausted steam as a first element of a condensate system. From the condenser 15, condensate serially passes through a series of low pressure heaters 24, 25, 11, 12, 20 where the condensate is successively heated. From the low pressure heaters 24, 25, 11, 12, 20 condensate flows in a feed water tank which forms the next element of the condensate system. Condensate from the feed water tank 23 is directed into the last element of the condensate system, a series of High Pressure heaters 22.

The oxy boiler power plant further comprises Air Separation Unit having a Dryer with a dryer heater 5 wherein an extraction line 4 connects the steam extraction port 2 to the dryer heater 5. A drain line 8 then fluidly connects the dryer heater 5 to the condensate system.

In an exemplary embodiment shown in FIG. 2 steam is extracted from an IP steam turbine 1, preferably from an extraction port 2 taken from an intermediate stage of a multi stage IP steam turbine, which is typically used as a heat source for at least one of a series of High Pressure Heaters 22. In an exemplary embodiment shown in FIG. 2, the extraction system is routed via an extraction line 4 to a dryer heater 5 of the Air Separation Unit. The dryer heater 5 forms part of the Air Separation Unit dryer regeneration system. The steam pressure is controlled, typically to around 19.5 bar by means of an extraction control valve 6 located in the extraction line 4. Depending of the temperature of the extraction steam a de-superheater 7 may additional be located in the extraction line 4 upstream of dryer heater 5. When the Air Separation Unit dryer is based on molecular sieve technology this enables optimum regeneration temperature by ensuring nitrogen heating temperature of around 200° C. For part load or off-design conditions where pressure of extraction steam is inadequate a cold reheat regeneration steam line 18, as shown in FIG. 2, is used. This cold reheat regeneration steam line 18 connects the HP steam turbine exit 16 with the extraction line 4 and is configured with suitable valving to provide an alternate steam source to the IP steam turbine extraction port 2. To ensure adequate use of the cold reheat and pressure control to heat exchanger during an operating mode when the cold reheat regeneration steam line 18 is used to provide steam to the dryer heater 5 a regeneration steam control valve 19 may be located in the cold reheat regeneration steam line 18.

Figure 3:
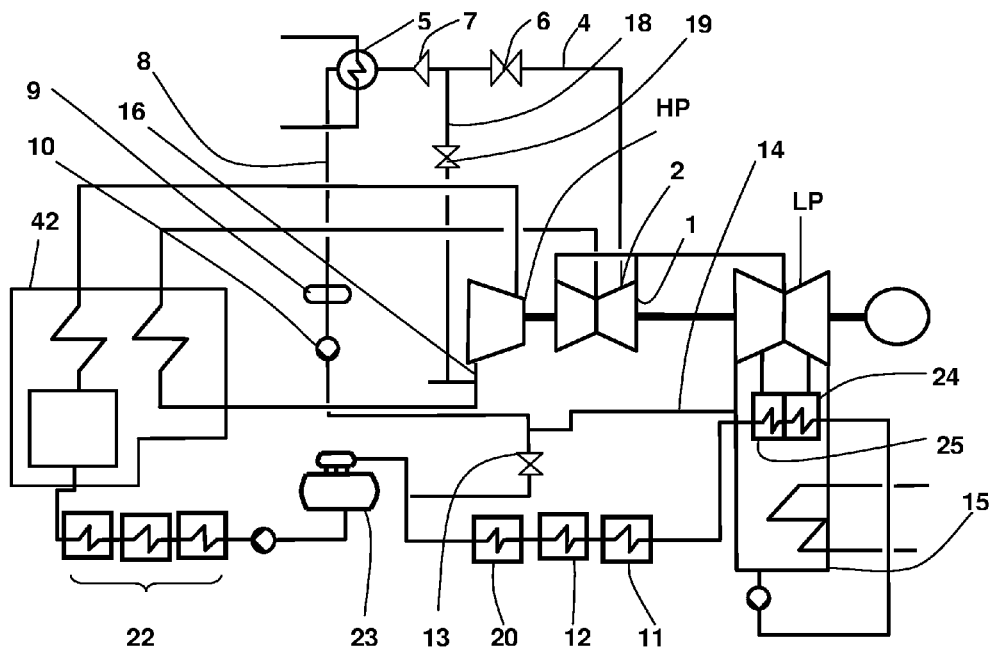
FIG. 3 is a schematic of the heat integration system of FIG. 2 in which an alternate drain line routing into the condensate system is shown.
Figure 4:
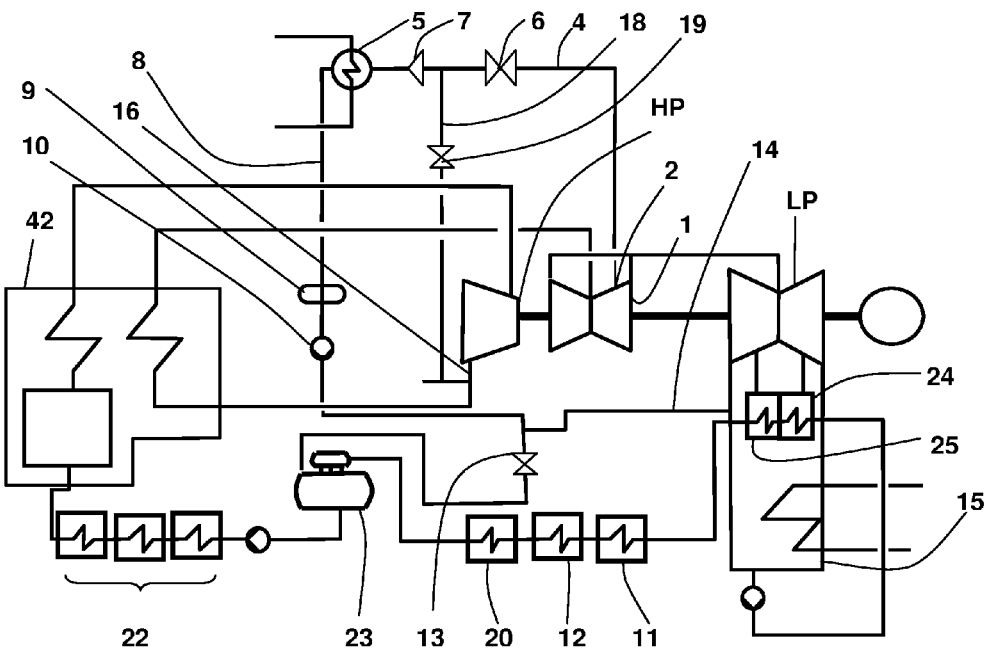
FIG. 4 is a schematic of another the heat integration system of FIG. 2 in which a further alternate drain line routing into the condensate system is shown.

From the dryer heater 5 the drain line 8 directs condensate formed in the dryer heater 5 to a condensate tank 9 from where it is pumped by a condensate pump 10 back into the condensate system. A condensate control valve 13 located in the drain line 8 downstream of the condensate pump 10 provides the condensate tank 9 with level control. In an exemplary embodiment shown in FIG. 2 the condensate is pumped back to the condensate system between the fourth of the series of low pressure heater 12 and the fifth of the series of low pressure heater 20. In an alternative or addition exemplary embodiment shown in FIG. 3, condensate is be pumped back to the condensate system to a point between the fifth of the series of low pressure heaters 20 and the feed water tank 23. In a further exemplary embodiment shown in FIG. 4 condensate is be pumped back to the feed water tank 23.

In an exemplary embodiment shown in FIG. 2, an emergency line 14 connects the drain line 8 to the condenser 15. This line is normally closed.

Although the disclosure has been herein shown and described in what is conceived to be the most practical exemplary embodiment, it will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

REFERENCE NUMBERS

1 IP Turbine
2 Extraction port
4 extraction line
5 dryer heater
6 control valve
7 de-superheater
8 drain line
9 condensate tank
10 condensate pump
11 Low Pressure Heater #3
12 Low Pressure Heater #4
13 drain control valve
14 emergency line
15 condenser
16 HP steam turbine exit
18 cold reheat regeneration steam line
19 regeneration steam control valve
20 Low Pressure heater #5
22 Serial High Pressure heaters
23 Feed Water Tank
24 Low Pressure Heater #1
25 Low Pressure Heater #2
101 Condenser Extraction pump first stage
102 Condenser
103 Condenser Extraction pump second stage
104 Condensate Polishing plant
106 Serial Low Pressure heater #1
107 Serial Low Pressure heater #2
108 Serial Low Pressure heater #3
109 Serial Low Pressure heater #4
131 Serial Low Pressure heater #5

132 Serial High Pressure heaters
136 Feed water tank
142 Boiler
HP High Pressure steam turbine
IP Intermediate pressure steam turbine
LP Low pressure steam turbine

What is claimed is:

1. A coal fired Oxy boiler power plant comprising a Rankine steam cycle comprising:
   a high pressure steam turbine comprising an exit and configured to expand steam;
   an intermediate pressure steam turbine comprising a steam extraction port and configured to expand steam from the high pressure steam turbine;
   a low pressure steam turbine configured to expand steam from the intermediate pressure steam turbine;
   a condensate system comprising:
      a condenser configured to condense steam exhausted from the low pressure steam turbine;
      a plurality of serial low pressure heaters arranged and numbered in sequential order based on a condensate flow direction and configured to receive and serially heat condensate from the condenser;
      a feed water tank configured and arranged to receive condensate from the series of low pressure heaters; and
      a series of high pressure heaters configured to receive condensate from the feed water tank; and
   an air separation unit comprising a dryer heater directly connected to the steam extraction port of the intermediate pressure steam turbine, the exit of the high pressure steam turbine, and a condensate tank for providing steam to the dryer heater to heat a regeneration fluid for use in a dryer of the air separation unit.

2. The coal fired Oxy boiler power plant of claim 1 further comprising a drain line fluidly connecting an extraction line passing through the dryer heater.

3. The coal fired oxy boiler power plant of claim 2 wherein the drain line exits the condensate tank and thereafter connects to the condensate system at a point between a fifth of the series of low pressure heaters and the feed water tank.

4. The coal fired oxy boiler power plant of claim 2 wherein the drain line exits the condensate tank and thereafter connects to the condensate system at the feed water tank.

5. The coal fired oxy boiler power plant of claim 2 wherein the drain line exits the condensate tank and thereafter connects to the condensate system between the series of low pressure heaters.

6. The coal fired oxy boiler power plant of claim 5 wherein the drain line exits the condensate tanks and thereafter connects to the condensate system at a point between a fourth of the series of low pressure heaters and a fifth of the series of low pressure heaters.

7. The coal fired oxy boiler power plant of claim 2 wherein the drain line further includes a condensate pump downstream of the condensate tank.

8. The coal fired oxy boiler power plant of claim 7 wherein the drain line further includes a condensate control valve downstream of the condensate pump configured to provide the condensate tank with level control.

9. The coal fired Oxy boiler power plant of claim 2 further comprising an emergency line connected to the drain line and the condenser.

10. The coal fired Oxy boiler power plant of claim 1 further comprising an extraction control valve located in an extraction line connecting the steam extraction port of the intermediate pressure steam turbine and the dryer heater.

11. The coal fired Oxy boiler power plant of claim 10 further comprising a de-superheater in the extraction line configured to remove superheat from steam in the extraction line.

12. The coal fired Oxy boiler power plant of claim 1 further comprising an extraction line connecting the steam extraction port of the intermediate pressure steam turbine and the dryer heater, and a cold reheat regeneration steam line connected at a first end to the exit of the high pressure steam turbine and at a second end to the extraction line.

13. The coal fired Oxy boiler power plant of claim 1 wherein the intermediate pressure steam turbine is a multistage intermediate pressure steam turbine and the steam extraction port is configured and arranged to extract steam from an intermediate stage of the intermediate pressure steam turbine.

* * * * *